United States Patent
Gunda et al.

(10) Patent No.: US 10,873,565 B2
(45) Date of Patent: Dec. 22, 2020

(54) MICRO-SEGMENTATION OF VIRTUAL COMPUTING ELEMENTS

(71) Applicant: Nicira, Inc., Palo Alto, CA (US)

(72) Inventors: Laxmikant Gunda, San Jose, CA (US); Rajiv Krishnamurthy, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 170 days.

(21) Appl. No.: 15/790,303

(22) Filed: Oct. 23, 2017

(65) Prior Publication Data

US 2018/0183757 A1 Jun. 28, 2018

Related U.S. Application Data

(60) Provisional application No. 62/437,891, filed on Dec. 22, 2016.

(51) Int. Cl.
*H04L 29/06* (2006.01)
*G06F 9/455* (2018.01)

(52) U.S. Cl.
CPC ...... *H04L 63/0227* (2013.01); *G06F 9/45533* (2013.01); *G06F 9/45558* (2013.01); *H04L 63/0218* (2013.01); *G06F 2009/45587* (2013.01); *G06F 2009/45595* (2013.01)

(58) Field of Classification Search
CPC ............. H04L 63/0227; H04L 63/0218; G06F 9/45558; G06F 9/45533; G06F 2009/45587; G06F 2009/45595
See application file for complete search history.

(56) References Cited

U.S. PATENT DOCUMENTS

| | | | |
|---|---|---|---|
| 9,467,476 B1 | 10/2016 | Shieh et al. | |
| 2005/0262554 A1* | 11/2005 | Brooks | H04L 63/0263 726/11 |
| 2014/0245423 A1 | 8/2014 | Lee | |

(Continued)

FOREIGN PATENT DOCUMENTS

| | | |
|---|---|---|
| WO | 2015108514 A1 | 7/2015 |
| WO | 2016160599 A1 | 10/2016 |

OTHER PUBLICATIONS

"Notification of Transmittal of the International Search Report and the Written Opinion of the International Searching Authority, or the Declaration"; PCT/US2017/067758; dated Mar. 1, 2018; 11 pages.

*Primary Examiner* — Jeffrey D. Popham

(57) ABSTRACT

The technology disclosed herein enables micro-segmentation of virtual computing elements. In a particular embodiment, a method provides identifying one or more multi-tier applications comprising a plurality of virtual machines. Each application tier of the one or more multi-tier applications comprises at least one of the plurality of virtual machines. The method further provides maintaining information about the one or more multi-tier applications. The information at least indicates a security group for each virtual machine of the plurality of virtual machines. Additionally, the method provides identifying communication traffic flows between virtual machines of the plurality of virtual machines and identifying one or more removable traffic flows of the communication traffic flows based, at least in part, on the information. The method then provides blocking the one or more removable traffic flows.

18 Claims, 5 Drawing Sheets

(56) References Cited

U.S. PATENT DOCUMENTS

2015/0372977 A1\* 12/2015 Yin .................... H04L 63/0236
  726/1
2016/0191463 A1\* 6/2016 Mohanty ............ H04L 63/0227
  726/11

\* cited by examiner

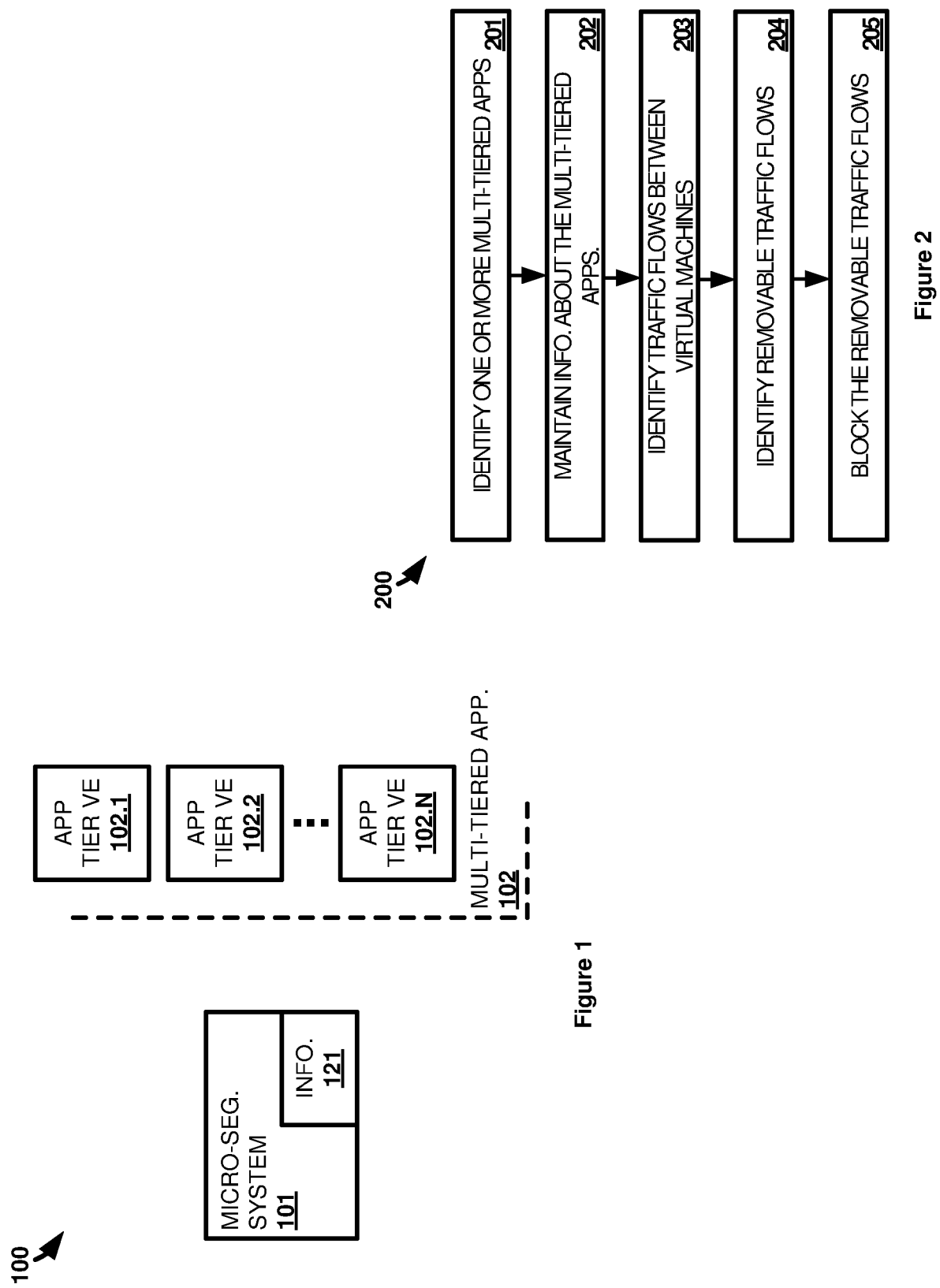

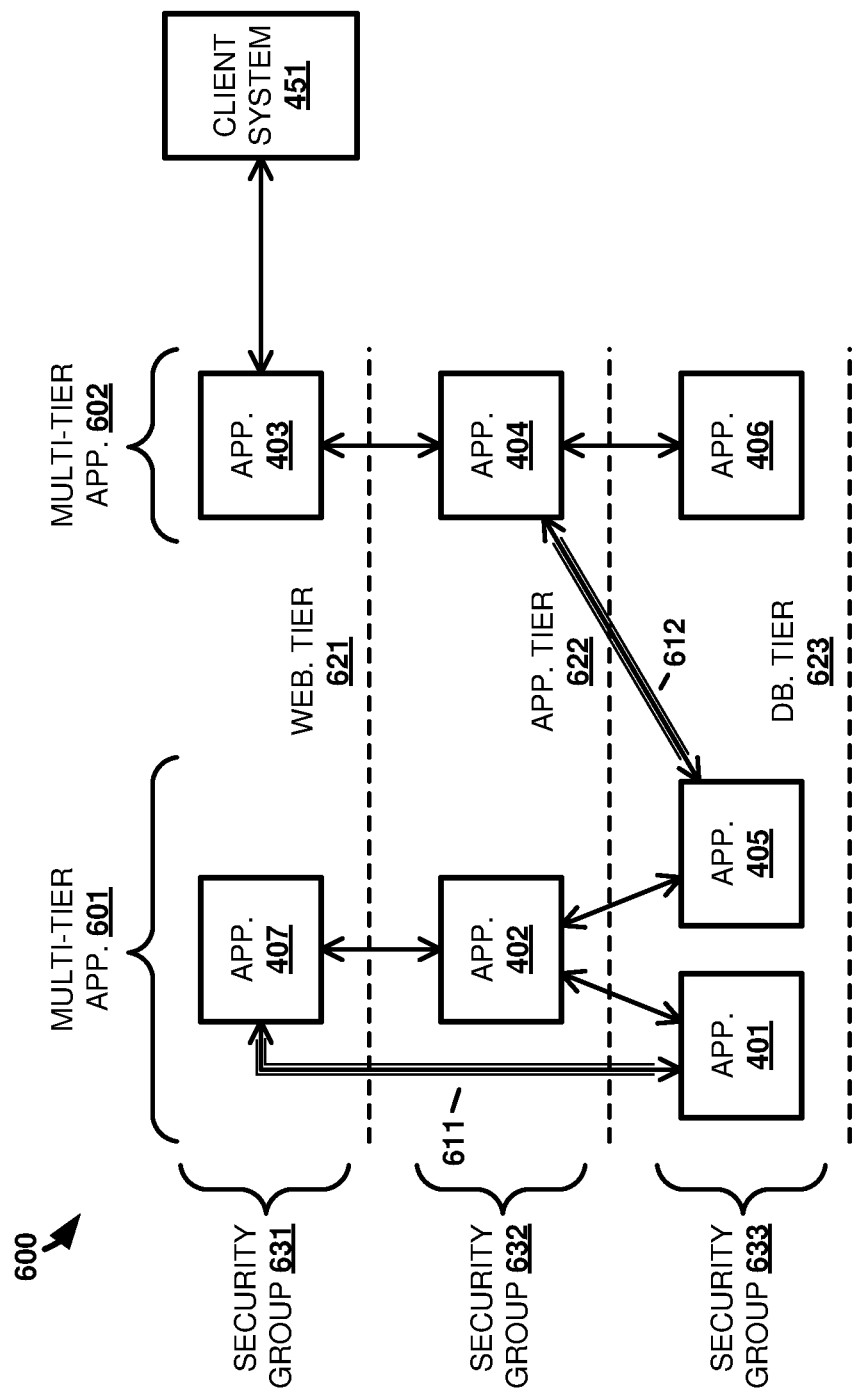

MICRO-SEGMENTATION OF VIRTUAL COMPUTING ELEMENTS

RELATED APPLICATIONS

This application is related to and claims priority to U.S. Provisional Patent Application 62/437,891, titled "MICRO-SEGMENTATION OF VIRTUAL COMPUTING ELEMENTS," filed Dec. 22, 2016, and which is hereby incorporated by reference in its entirety.

TECHNICAL BACKGROUND

Applications accessible over a communication network may be segmented into various groups. Access to applications in one group may be controlled differently than access to applications in another group. Controlling that access may be performed by a network firewall type system that regulates network traffic being exchanged between physical and/or virtual computing systems on which the applications are running. For example, if a user does not want applications in one group to exchange communications with applications in another group, the user may create a firewall rule to prevent such communications.

Many applications are implemented with multiple tiers. Each application tier may be executing on a different system. In one common example, a web-based application, which clients may access over the Internet, may be implemented in three tiers: a web server tier, an application server tier, and a database tier. Each of the three tiers perform a specific function to support the provision of the web-based application to the clients. While each of the three tiers are applications in and of themselves, the application segmentation discussed above would group them together as the one web-based application. Thus, controlling access between individual application tiers based on that grouping is not possible.

SUMMARY

The technology disclosed herein enables micro-segmentation of virtual computing elements. In a particular embodiment, a method provides identifying one or more multi-tier applications comprising a plurality of virtual machines. Each application tier of the one or more multi-tier applications comprises at least one of the plurality of virtual machines. The method further provides maintaining information about the one or more multi-tier applications. The information at least indicates a security group for each virtual machine of the plurality of virtual machines. Additionally, the method provides identifying communication traffic flows between virtual machines of the plurality of virtual machines and identifying one or more removable traffic flows of the communication traffic flows based, at least in part, on the information. The method then provides blocking the one or more removable traffic flows.

In some embodiments, the method provides presenting the one or more removable traffic flows to a user and receiving confirmation from the user that the removable traffic flows should be removed. In these embodiments, the blocking of the removable traffic flows occurs in response to the confirmation. Also, in these embodiments, presenting the removable traffic flows includes presenting a graphical display that visually groups virtual machines of the plurality of virtual machines into respective application tiers and respective security groups and displaying the communication traffic flows between the virtual machines. In some cases, the graphical display labels the application tiers and the security groups. Additionally, in some cases, presenting the removable traffic flows further includes highlighting the removable traffic flows of the displayed communication traffic flows.

In some embodiments, blocking the one or more removable traffic flows comprises implementing one or more firewall rules that block the one or more removable traffic flows.

In some embodiments, each of multi-tier applications comprises three tiers, wherein the three tiers include a web tier, application tier, and database tier.

In some embodiments, the one or more removable traffic flows comprise traffic flows other than those between the web tier and the application tier, the application tier and the database tier, and an external system and the web tier.

In some embodiments, identifying the communication traffic flows comprises, in one or more computing systems hosting the plurality of virtual machines, identifying communication traffic going into and out of each virtual machine of the plurality of virtual machines.

In some embodiments, the information further includes an identifier for each of the one or more multi-tier applications.

In another embodiment, a system is provided having one or more computer readable storage media and a processing system operatively coupled with the one or more computer readable storage media. Program instructions stored on the one or more computer readable storage media, when read and executed by the processing system, direct the processing system to identify one or more multi-tier applications comprising a plurality of virtual machines. Each application tier of the one or more multi-tier applications comprises at least one of the plurality of virtual machines. The program instructions further direct the processing system to maintain information about the one or more multi-tier applications. The information at least indicates a security group for each virtual machine of the plurality of virtual machines. Also, the program instructions direct the processing system to identify communication traffic flows between virtual machines of the plurality of virtual machines. Furthermore, the program instructions direct the processing system to identify one or more removable traffic flows of the communication traffic flows based, at least in part, on the information and block the one or more removable traffic flows.

BRIEF DESCRIPTION OF THE DRAWINGS

FIG. 1 illustrates a computing environment for micro-segmenting virtual computing elements.

FIG. 2 illustrates a method of operating the computing environment to micro-segment virtual computing elements.

FIG. 6 illustrates an operational scenario of the other computing environment to micro-segment virtual computing elements according to one implementation.

DETAILED DESCRIPTION

Figure 3:
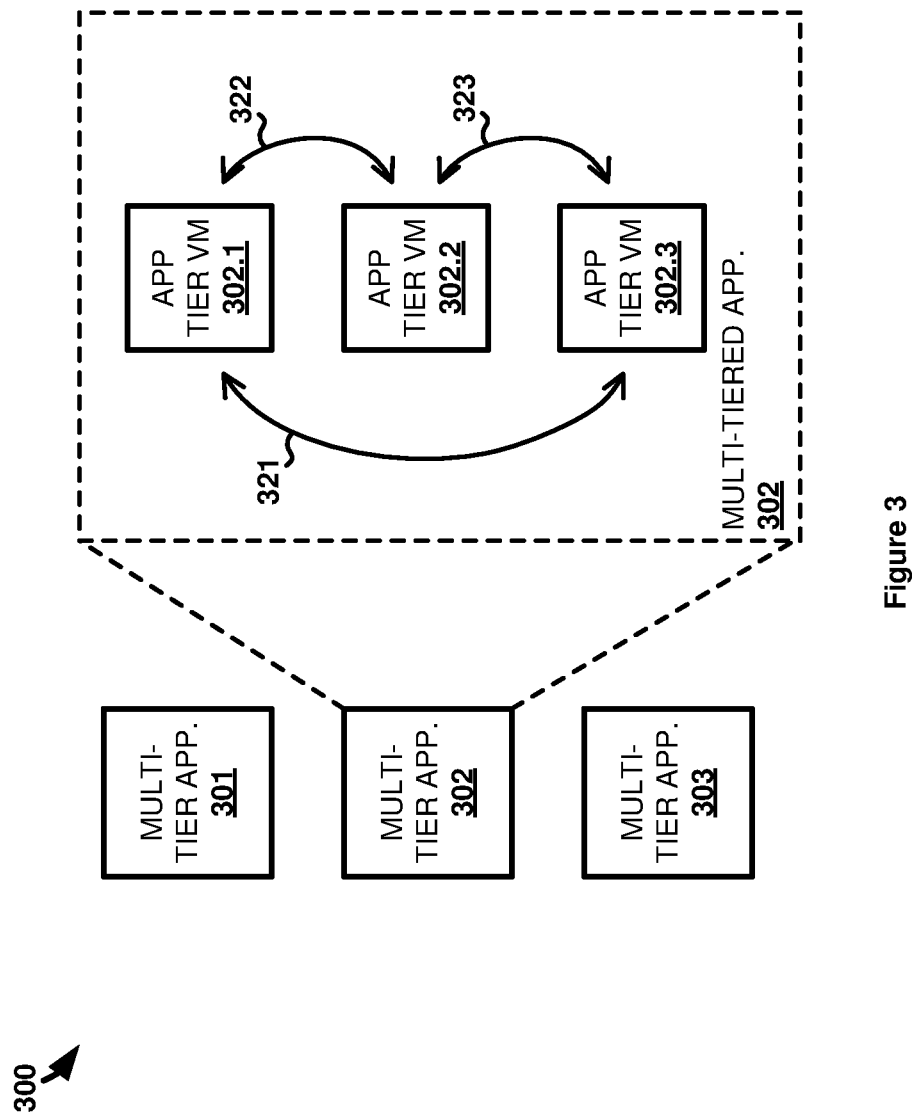
FIG. 3 illustrates an operational scenario of the computing environment to micro-segment virtual computing elements.

The implementations provided herein enable micro-segmentation of virtual computing elements. Some virtual computing elements, such as virtual machines, containers, etc., may operate in conjunction as part of a higher-level element. In one example, an application may be a multi-tier application implemented using one or more virtual elements for each tier. Each virtual element may be a virtual machine executing an application tier such as a web server or web application, or the virtual element may be a containerized application, such as one implemented with Docker® technology available from Docker, Inc. Rather than simply grouping the higher-level element (i.e., the multi-tier application), this disclosure describes the grouping of the virtual elements that comprise one or more tiers of the application and applying policies (e.g., firewall rules) to each virtual element according to the group it is a part of. Segmenting the components of the multi-tier application into various groups allows for better analysis of communications exchanged within and to and from the application. That is, grouping the multi-tier application as a whole would only allow for analysis of traffic exchanged with the application as a whole. Micro-segmenting the application into virtual elements allows for analysis and policy enforcement of network traffic exchanged with each virtual element and between each virtual element. A user may be presented with the results of the analysis to manage the network traffic between the virtual elements.

FIG. 1 illustrates computing environment 100 for micro-segmenting virtual computing elements. Computing environment 100 includes micro-segmentation system 101 and multi-tier application 102. Multi-tier application 102 is implemented with application tier virtual elements 102.1-N. Each tier of multi-tier application 102 may include one or more of application tier virtual elements 102.1-N. Application tier virtual elements 102.1-N are implemented on physical host computing systems through the execution of a hypervisor, or some other software element having similar functionality, thereon. Micro-segmentation system 101 may similarly be implemented as one or more virtual elements itself. In some cases, micro-segmentation system 101 may be implemented on a host computing system along with one or more of application tier virtual elements 102.1-N.

FIG. 2 illustrates method 200 of operating computing environment 100 to micro-segment virtual computing elements. Method 200 includes micro-segmentation system 101 identifying one or more multi-tier applications, such as multi-tier application 102, comprising a plurality of virtual elements, such as application tier virtual elements 102.1-N (201). Each application tier of multi-tier application 102, and any other multi-tier application identified, comprises at least one of the plurality of virtual elements. Multi-tier application 102 may be identified using a discovery process that monitors virtual elements executing in computing environment 100 to determine a tier in which each virtual element is operating. Other manners of identifying multi-tier applications may also be used, including receiving information identifying multi-tier applications from a user or other system.

Method 200 further provides micro-segmentation system 101 maintaining information in tiered application information 121 about the one or more multi-tier applications (202). The information at least indicates a security group for each of the virtual elements. The security groups may be pre-defined by a user such that certain types of virtual elements (e.g., virtual elements performing certain functions) are placed into corresponding security groups. Alternatively, micro-segmentation system 101 may infer a security group for each virtual element based information obtained while monitoring the virtual elements. Other manners of placing the virtual elements into security groups may also be used. Each security group may define network security policies that should be implemented on virtual elements therein (e.g., virtual elements in one security group may only be allowed to communicate with elements in a particular other security group).

Additionally, method 200 provides micro-segmentation system 101 identifying communication traffic flows between virtual machines of the plurality of virtual machines (203). The monitoring of communication flows may start being performed before, during, or after steps 201 and 202 above and continue for any amount of time. Preferably the amount of time is at least an amount of time necessary to presume all potential communication flows are captured. The identification of communication flows at least identifies where a flow is coming from and where the flow is directed to, such as between two virtual elements or between a virtual element and a system, network, or device outside of computing environment 100.

After identifying the communication traffic flows, method 200 provides micro-segmentation system 101 identifying one or more removable traffic flows of the communication traffic flows based, at least in part, on the information in tiered application information 121 (204). Removable traffic flows may be communication traffic flows that are outside the normal operation of the virtual elements, flows that are contrary to the security policies of the involved security groups, or flows that otherwise should not be allowed going forward. For instance, application tier virtual element 102.1 may be in a security group that should only communicate with virtual elements in a specific other security group. If application tier virtual element 102.1 is involved in a traffic flow with a virtual element in a different security group, then that traffic flow would be identified as removable.

Method 200 then provides micro-segmentation system 101 blocking the one or more removable traffic flows (205). Blocking the removable traffic flows may comprise implementing one or more firewall rules with criteria that would capture the removable traffic flows and prevent the removable flows from continuing. In some cases, a user may first be presented with information describing at least the removable traffic flows so that the user can provide input on whether the removable traffic flows should be removed. The user may simply confirm that the removable traffic flows should be blocked, may select a subset of the removable traffic flows that should be blocks, add other communication traffic flows to the removable traffic flows, or provide other input. In some examples, the user may also be presented with the grouping of the virtual elements maintained in tiered application information 121 and can adjust that grouping as they wish. In this case the "user" may be a network, system, or application administrator (i.e., a person responsible for administering the network, system, or application). Alternatively, the user may be an expert system or other management entity that can autonomously identify network flows that should be blocked and potentially flag such flows as being anomalous or are in contravention to a defined high-level policy. A flow that is anomalous or otherwise improper may indicate the presence of malware in the originating virtual element. In various embodiments, the response may be to simply block the flow by implementing a new firewall rule as described above. Additional or alternative responses to an indication of malware may be to quarantine the VM (e.g., by placing it in a quarantine security group that requires all network flows to and from the virtual element be black-holed), or to pause the virtual element by descheduling it on its host, thus preventing it from executing any new instructions, until it can be analyzed.

FIG. 3 illustrates operational scenario 300 of computing environment 100 to micro-segment virtual computing elements. In operational scenario 300, using method 200, micro-segmentation system 101 has identified multi-tier application 301, multi-tier application 302, and multi-tier application 303. The virtual elements that make up each multi-tier application, in this example, are virtual machines implemented on one or more host computing systems. As such, micro-segmentation system 101 maintains information about the virtual machines that comprise each of multi-tier applications 301-303. Operational scenario 300 only illustrates the three virtual machines that multi-tier application 302 comprises, but it should be understood the multi-tier application 301 and multi-tier application 303 also comprise two or more virtual machines.

As shown, multi-tier application 302 includes application tier virtual machine 302.1, application tier virtual machine 302.2, and application tier virtual machine 302.3. For simplicity, each virtual machine operates in a distinct tier that also corresponds to a distinct security group. Three communication flows were identified in operational scenario 300: communication traffic flow 321, communication traffic flow 322, and communication traffic flow 323. In this example, micro-segmentation system 101 is configured to recognize that communication flows between the security group of application tier virtual machine 302.1 and the security group of application tier virtual machine 302.3 should not be occurring. Therefore, micro-segmentation system 101 determines that communication traffic flow 321 is a removable traffic flow.

Micro-segmentation system 101 may automatically block communication traffic flow 321 or may first inform a user about the removable traffic flow. In one case, the user may be presented with a display similar to FIG. 3 itself. The user may confirm that communication traffic flow 321 should be blocked. Alternatively, the user may instruct micro-segmentation system 101 not to block communication traffic flow 321, may indicate that application tier virtual machine 302.1 and/or application tier virtual machine 302.3 are not in the correct security group (e.g., communication traffic flow 321 may be allowed if micro-segmentation system 101 had placed them in the correct security group initially), or provide some other input to micro-segmentation system 101 based on the provided information.

Figure 4:
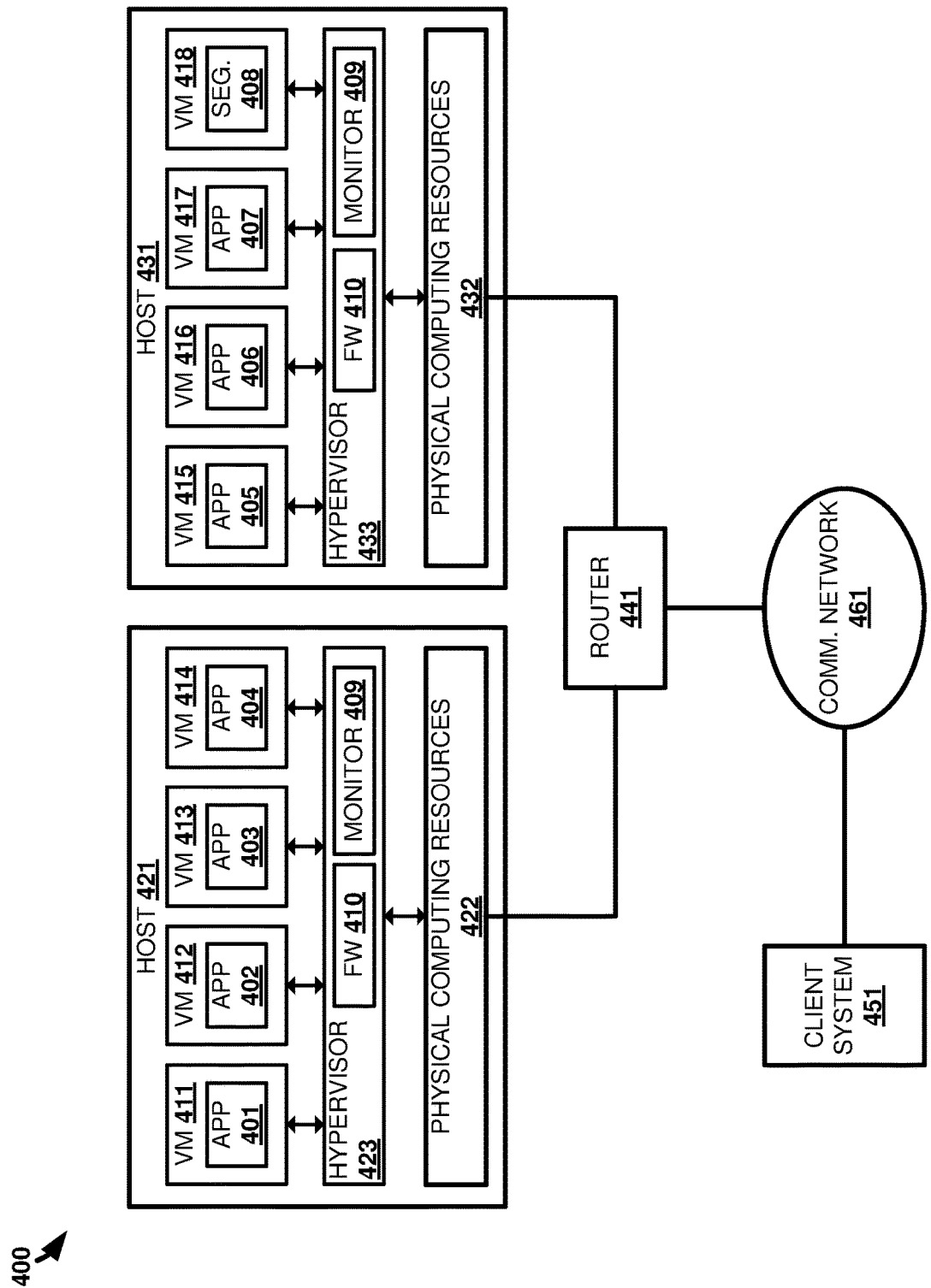
FIG. 4 illustrates another computing environment for micro-segmenting virtual computing elements.

FIG. 4 illustrates computing environment 400 for micro-segmenting virtual computing elements. Computing environment 400 includes host computing system 421, host computing system 431, communications router 441, communication network 461, and client system 451. In this example, communications router 441 comprises a layer 3 (network layer) router in the Open Systems Interconnection model (OSI model) that routes communications to/from and between host computing systems 421 and 431. Communication router 441 is further configured to exchange communications with other systems and devices over communication network 461. Communication network 461 may include the Internet, one or more local area networks, and/or one or more wide area networks. While shown separately, communication router 441 may be considered part of communication network 461 in some examples. Client system 451 is able to communicate with host computing systems 421 and 431 via communication network 461 and communication router 441.

In this example, host computing system 421 executes hypervisor 423 to allocate physical computing resources 422 among virtual machines 411-414. Likewise, host computing system 431 executes hypervisor 433 to allocate physical computing resources 432 among virtual machines 415-418. Physical computing resources 422 and 432 may include processing resources (e.g., CPU time/cores), memory space, network interfaces, user interfaces, or any other type of resource that a physical computing system may include. Each of virtual machines 411-418 include applications 401-408 executing therein. Application 408, in particular, is an application that implements a micro-segmentation system on virtual machine 418 and host computing system 431. Hypervisors 423 and 433 further implement communication traffic monitor 409 and firewall 410. In some cases, the functionalities of communication traffic monitor 409 and firewall 410 may be incorporated into one another.

It should be understood that the distribution of virtual machines evenly across two host computing systems, as shown in FIG. 4, is merely exemplary. The eight virtual machines shown may instead be implemented on any number of host computing systems from one to eight. Likewise, host computing systems 321 and 331 could host additional hosts and virtual machines and/or other virtual elements that are not involved in this example.

Figure 5:
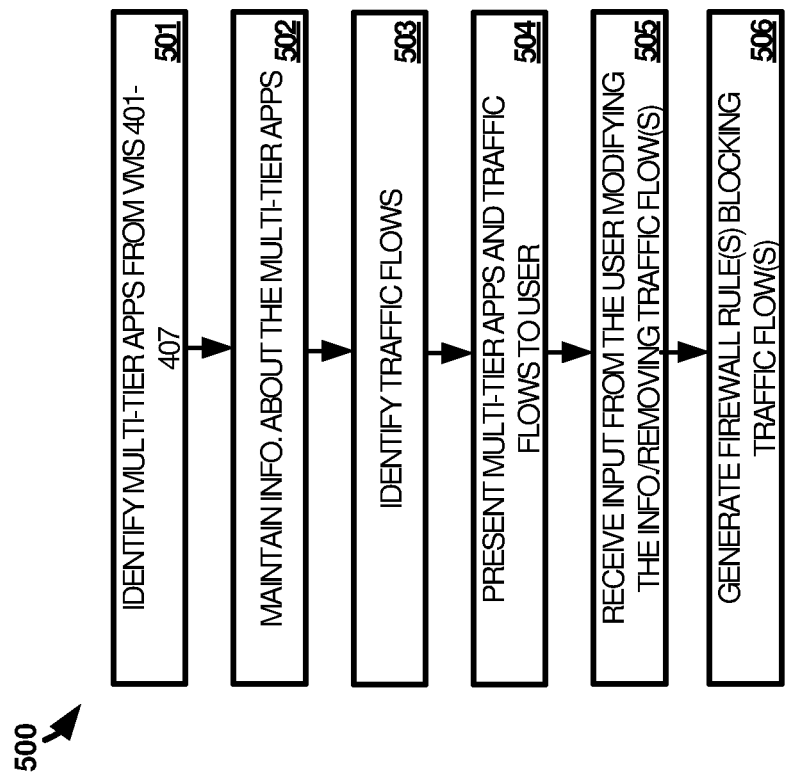
FIG. 5 illustrates a method of operating the other computing environment to micro-segment virtual computing elements according to one implementation.

FIG. 5 illustrates method 500 of operating the computing environment 400 to micro-segment virtual computing elements according to one implementation. Method 500 provides micro-segmentation application 408 identifying multi-tier applications from virtual machines 401-407 (501). The multi-tier applications may be identified by querying virtual machines 401-407 for information that identifies the processes executing thereon, by monitoring traffic exchanged with virtual machines 401-407, by receiving identification information from a user, or in some other manner—including combinations thereof. The identification of multi-tiered applications includes, and likely stems from, the identification of the tiered applications that comprise the identified multi-tiered applications. Those tiered applications, in this example, are some combination of applications 401-407.

Micro-segmentation application 408 additionally maintains information about the identified multi-tier applications (502). The information may include identifying information for both the multi-tier applications as a whole and/or the tiered applications that comprise the tiers of those multi-tier applications, information about a security group into which each tiered application is grouped, or any other type of information that might be beneficial for determining whether communication traffic flows should be allowed or denied.

Furthermore, to that end, micro-segmentation application 408 identifies traffic flows between the tiered applications 401-407 (503). Communication traffic monitor 409 is employed by micro-segmentation application 408 to monitor traffic going into and out of each virtual machine 411-417 to identify communication traffic flows between applications 401-407 therein. By virtue of a hypervisor's function to facilitate network communications with virtual machines, communication traffic monitor 409's position as an element within hypervisors 423 and 433 allow communication traffic monitor 409 to obtain information about all network traffic to or from virtual machines 411-417. That is, communication traffic monitor 409 position as a distributed element across hypervisors 423 and 433 allows communication traffic monitor 409 to capture network traffic between virtual machines on the same host computing system as well as network traffic between virtual machines on different host computing systems (e.g., network traffic from virtual machine 413 to virtual machine 417). Communication traffic monitor 409 may only monitor communication traffic upon request by micro-segmentation application 408, may be configured to continually monitor communication traffic over time and provide information about communication traffic flows responsive to a request from micro-segmentation application 408, or may be configured to monitor traffic in some other time increment beneficial to the identification of communication traffic flows. Moreover, in some examples, traffic information that can be obtained by communication traffic monitor 409 may be used with respect to identification of the multi-tier applications in step 501 above.

The multi-tier applications, along with their component tier applications 401-407, are then presented to a user with an indication of the traffic flows between tier applications 401-407 (504). The presentation may be a graphical display that can visually represent relationships between applications (e.g., by visually grouping applications based on security group, application tier, etc.) and the communication traffic flows, may be a text based readout describing the application relationships and communication traffic flows, or some other type of audible or visual representation of similar information—including combinations thereof. Regardless of the presentation style, the presentation is meant to allow the user to at least easily recognize and analyze whether the applications are properly grouped and whether communication traffic flows between those applications are proper. As such, the presentation may further include identification information for each application (e.g., application name), on which host computing system the application is executing, how frequent each communication traffic flow occurs, or any other type of information. Since micro-segmentation application 408 is implemented in a virtual machine in this example, the presentation may be performed through a user interface of host computing system 431 or through a display of a computing system in communication with host computing system 431 (e.g., a personal workstation of the user).

Micro-segmentation application 408 then receives input from the user modifying information displayed and indicating traffic flows that should be removed (505). For example, the user may change the grouping of an application, change the tier of an application, rename a group or tier, indicate a communication traffic flow that should be blocked, or indicate some other type of modification to whatever information is presented. For requested information changes, micro-segmentation application 408 modifies the information maintained about the multi-tier applications in accordance with the user's requests. If certain information cannot be changed, micro-segmentation application 408 may notify the user of that fact so that the user can act accordingly.

To remove communication traffic flows, micro-segmentation application 408 generates a firewall rule, or rules, that blocks the communication traffic flows indicated by the user (506). Firewall 410 receives the firewall rule from micro-segmentation application 408 (or intermediate network controller/manager component who receives the rule update from micro-segmentation application 408) and implements the rule on communication traffic with the virtual machines going forward. In some cases, the generation of the firewall rule may involve amending a firewall rule already in place rather than generating the firewall rule from scratch. In this example, firewall 410 is implemented as an element within hypervisors 423 and 433, however, other types of firewalls, including physical network elements, may be used instead as long as the firewall is properly positioned to block the communication traffic defined in the firewall rule. After implementing the rule, the presentation may be updated to show that the requested communication traffic flows have been blocked.

FIG. 6 illustrates operational scenario 600 of computing environment 400 to micro-segment virtual computing elements according to one implementation. Operational scenario 600 is an example of how information may be presented during the execution of method 500, described above. In operational scenario 600, two multi-tier applications are identified by micro-segmentation application 408: multi-tier application 601 and multi-tier application 602. Multi-tier application 601 and multi-tier application 602 are each three-tier applications in this example but may include any number of two or more tiers in other examples. Multi-tier application 601 includes application 407, application 402, application 401, and application 405. Multi-tier application 602 includes application 403, application 404, and application 406.

Operational scenario 600 further shows that application 407 and application 403 are located in web server tier 621, application 402 and application 404 are located in application tier 622, and application 401, application 405, and application 406 are located in database tier 623. For simplicity, security groups 631-633 correspond to respective application tiers 621-623. Although, in other examples, the security groups may be defined differently. For example, application 407 and application 403, despite both being in web server tier 621, may be in different security groups, as may be desired if information accessible by each application differs in sensitivity.

Communication traffic flows between applications 401-407 are also shown in operational scenario 600. Each communication traffic flow is shown as being bidirectional, although some examples may show the direction of each flow, as direction may be important (i.e., traffic in one direction may be desired while traffic in another may not). Operational scenario 600 specifically highlights communication traffic flow 611 and communication traffic flow 612 as being removable traffic flows. In one example, communication traffic flow 611 and communication traffic flow 612 may be highlighted after a user has indicated that communication traffic flow 611 and communication traffic flow 612 should be removed. In other examples, micro-segmentation application 408 may automatically determine that communication traffic flow 611 and communication traffic flow 612 should be removed and indicate that determination to the user so that the user can confirm the removal. Micro-segmentation application 408 may be able to make such a determination because the definitions of security group 631 and/or security group 633 indicates that traffic between the two security groups should not occur. Communication traffic flow 611 violates that definition. Furthermore, even though communications may be allowed between security group 632 and security group 633, communication traffic flow 612 may be a removable traffic flow because the definitions of security group 632 and security group 633 indicate that only applications within the same multi-tier application are allowed. Other reasons for communication traffic flows 611 and 612 being removable may also or instead be used in other examples.

Additionally, operational scenario 600 may further allow a user to make changes to other information displayed. For example, the user may change the security group of one or more applications or may change the tier in which an application is placed. Responsive to each change, or responsive to multiple changes, micro-segmentation application 408 may reform the presentation of operational scenario 600 to account for the changes. For instance, an application placed by a user into a different security group would now be displayed in that different security group. Likewise, any changes to the removable traffic flows recommended by micro-segmentation application 408 due to that security group change may also be displayed.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of micro-segmenting virtual computing elements based on applications running thereon, the method comprising:
    in a micro-segmentation system implemented using one or more physical processors:
    querying a plurality of virtual machines to identify first applications executing thereon;
    after the first applications are identified, determining that the plurality of virtual machines implement one or more multi-tier applications based on the first applications, wherein each of the multi-tier applications comprises two or more of the first applications;
    after determining that the plurality of virtual machines implement the one or more multi-tier applications, determining in which tier of two or more tiers each of the first applications operate for the one or more multi-tier applications;
    identifying communication traffic flows that occur, and are allowed to occur, during an amount of time between virtual machines of the plurality of virtual machines through one or more hypervisors executing on physical computing systems to host the plurality of virtual machines, wherein a communication traffic monitor in the one or more hypervisors is employed by the micro-segmentation system to perform the identifying of the communication traffic flows;
    after determining the tier in which each of the first applications operate, identifying with which multi-tier application of the one or more multi-tier applications each of the first applications is associated based on the communication traffic flows and the tier in which each of the first applications operates;
    after identifying with which multi-tier application of the one or more multi-tier applications each of the first applications is associated, identifying one or more removable traffic flows of the communication traffic flows, wherein each of the removable traffic flows comprises one of the communication traffic flows that a high-level network traffic policy indicates should not be allowed to occur, wherein the high-level network traffic policy defines, based on security groups, which of the two or more tiers communications should be allowed to flow between and which of the two or more multi-tier applications communications should be allowed to flow between; and
    directing a firewall in the one or more hypervisors to block the one or more removable traffic flows.

2. The method of claim 1, further comprising:
    presenting the one or more removable traffic flows to a user;
    receiving confirmation from the user that the removable traffic flows should be removed; and
    wherein directing the firewall to block the one or more removable traffic flows occurs in response to the confirmation.

3. The method of claim 2, wherein presenting the removable traffic flows comprises:
    presenting a graphical display that visually groups virtual machines of the plurality of virtual machines into respective application tiers and respective security groups; and
    displaying the communication traffic flows between the virtual machines.

4. The method of claim 3, wherein the graphical display labels the application tiers and the security groups.

5. The method of claim 3, wherein presenting the one or more removable traffic flows further comprises:
    highlighting the removable traffic flows of the displayed communication traffic flows.

6. The method of claim 1, wherein directing the firewall to block the one or more removable traffic flows comprises implementing one or more firewall rules that block the one or more removable traffic flows.

7. The method of claim 1 wherein each of multi-tier applications comprises three tiers, wherein the three tiers include a web tier, application tier, and database tier.

8. The method of claim 7, wherein the one or more removable traffic flows comprise traffic flows other than those between the web tier and the application tier, the application tier and the database tier, and an external system and the web tier.

9. The method of claim 1, wherein the communication traffic flows are identified from network traffic monitored by one or more hypervisors hosting the plurality of virtual machines.

10. A system for micro-segmenting virtual computing elements based on applications running thereon, the system comprising:
    one or more computer readable storage media;
    a processing system, comprising one or more central processing unit cores, operatively coupled with the one or more computer readable storage media; and
    program instructions stored on the one or more computer readable storage media that, when read and executed by the processing system, direct the processing system to:
    query a plurality of virtual machines to identify first applications executing thereon;
    after the first applications are identified, determine that the plurality of virtual machines implement one or more multi-tier applications based on the first applications, wherein each of the multi-tier applications comprises two or more of the first applications;
    after the plurality of virtual machines are determined to implement the one or more multi-tier applications, determine in which tier of two or more tiers each of the first applications operate for the one or more multi-tier applications;
    identify communication traffic flows that occur, and are allowed to occur, during an amount of time between virtual machines of the plurality of virtual machines through one or more hypervisors executing on physical computing systems to host the plurality of virtual machines, wherein a communication traffic monitor in the one or more hypervisors is employed by the micro-segmentation system to perform the identifying of the communication traffic flows;
    after the tier in which each of the first applications operate is determined, identify with which multi-tier application of the one or more multi-tier applications each of the first applications is associated based on the communication traffic flows and the tier in which each of the first applications operates;

after with which multi-tier application of the one or more multi-tier applications each of the first applications is associated are identified, identify one or more removable traffic flows of the communication traffic flows, wherein each of the removable traffic flows comprises one of the communication traffic flows that a high-level network traffic policy indicates should not be allowed to occur, wherein the high-level network traffic policy defines, based on security groups, which of the two or more tiers communications should be allowed to flow between and which of the two or more multi-tier applications communications should be allowed to flow between; and direct a firewall in the one or more hypervisors to block the one or more removable traffic flows.

11. The system of claim 10, wherein the program instructions further direct the processing system to:

present the one or more removable traffic flows to a user;

receive confirmation from the user that the removable traffic flows should be removed; and wherein the program instructions direct the processing system to direct the firewall to block the one or more removable traffic flows in response to the confirmation.

12. The system of claim 11, wherein to present the removable traffic flows the program instructions direct the processing system to at least:

present a graphical display that visually groups virtual machines of the plurality of virtual machines into respective application tiers and respective security groups; and display the communication traffic flows between the virtual machines.

13. The system of claim 12, wherein the graphical display labels the application tiers and the security groups.

14. The system of claim 12, wherein to present the one or more removable traffic flows the program instructions further direct the processing system to at least:

highlight the removable traffic flows of the displayed communication traffic flows.

15. The system of claim 10, wherein to direct the firewall to block the one or more removable traffic flows the program instructions direct the processing system to at least:

implement one or more firewall rules that block the one or more removable traffic flows.

16. The system of claim 10 wherein each of multi-tier applications comprises three tiers, wherein the three tiers include a web tier, application tier, and database tier.

17. The system of claim 16, wherein the one or more removable traffic flows comprise traffic flows other than those between the web tier and the application tier, the application tier and the database tier, and an external system and the web tier.

18. The system of claim 10, wherein the communication traffic flows are identified from network traffic monitored by one or more hypervisors hosting the plurality of virtual machines.

* * * * *